May 5, 1964     T. NIETER     3,131,471
METHOD OF MATERIAL JOINING
Filed July 6, 1961
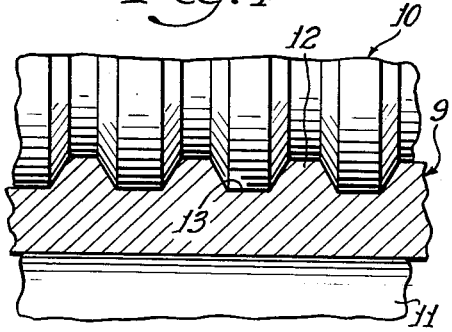
Fig. 1
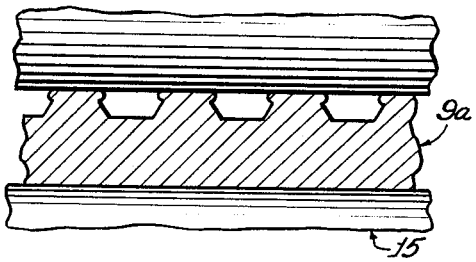
Fig. 2
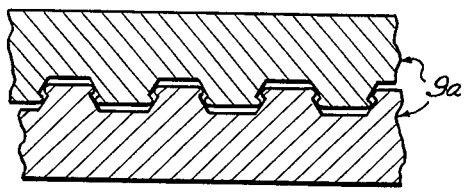
Fig. 3
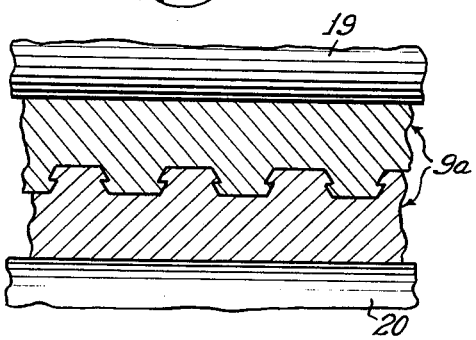
Fig. 4
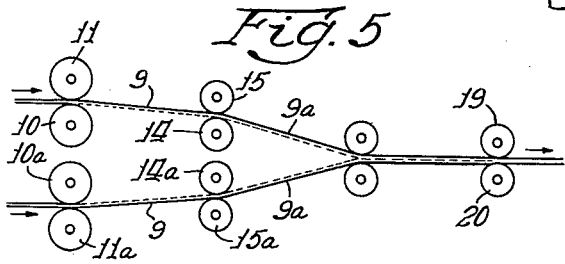
Fig. 5
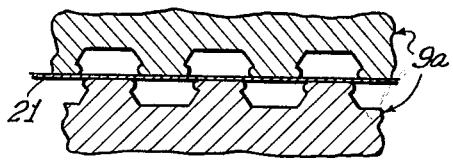
Fig. 6
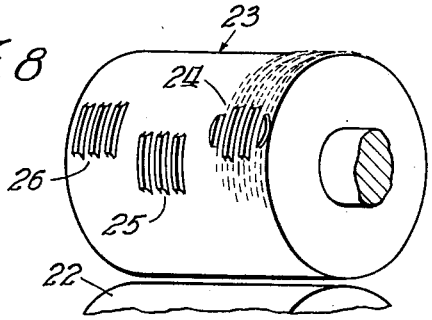
Fig. 8
Fig. 7
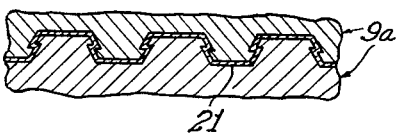
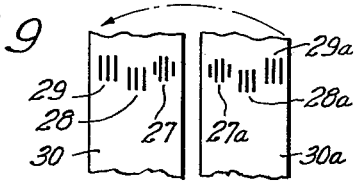
Fig. 9
Inventor:
Temple Nieter
By: F.A. Kranemark Atty United States Patent Office 3,131,471
Patented May 5, 1964

3,131,471
METHOD OF MATERIAL JOINING
Temple Nieter, Evanston, Ill., assignor to Borg-Warner Corporation, Chicago, Ill., a corporation of Illinois
Filed July 6, 1961, Ser. No. 122,185
4 Claims. (Cl. 29—521)

This invention relates to a method of joining pieces of malleable or plastic materials other than by welding, soldering or other commonly known methods such as fusing and as gluing.

This method according to this invention generally comprises the forming of matching formed surfaces on the pieces of material to be joined and thereafter placing the pieces of material together at their formed surfaces and applying pressure which thereby causes an interlocking at the junctures of the formed surfaces which completely eliminates voids that existed before the application of pressure as hereinafter more fully explained.

By this improved method, two dissimilar malleable materials may be joined as well as similar materials. When a plastic type material is used, it may be necessary to provide heat to produce the necessary malleable properties.

It is therefore an object of this invention to provide an improved method of joining two pieces of malleable materials other than by commonly known methods such as welding, soldering, fusing and gluing.

It is another important object of this invention to provide an improved method of permanently joining dissimilar pieces of material which leaves no voids at the joined areas.

It is also an important object of this invention to provide a method whereby pieces of malleable or plastic materials may be joined at low cost.

It is another important object of this invention to provide a method whereby a sheet of material may be inserted between the pieces of material to be joined thereby providing an insert between the pieces joined.

This invention consists of the novel methods to be hereinafter described and claimed for carrying out the above stated objects and such other objects as will be apparent from the following description of a preferred manner of exercising the invention, illustrated with reference to the accompanying drawings, wherein:

FIGURE 1 is a fragmentary view showing a piece of material, the surface of which is being formed between rolls to provide a formed surface comprising a series of ribs or raised portions having grooves or depressions therebetween;

FIGURE 2 shows the piece of material in FIGURE 1 after the top faces of the ribs have been mashed by a pair of rolls, shown fragmentary, to form overhung ledges;

FIGURE 3 is a view of a pair of pieces shown in FIGURE 2 assembled in non-interfering meshing engagement;

FIGURE 4 is a fragmentary view of the interlocked pair of pieces shown in FIGURE 3 after pressure has been applied by a pair of rolls;

FIGURE 5 is a semi-diagrammatic view of a pair of pieces to be joined in a continuous operation by passing them through a series of rolls which first form raised portions and depressions on the faces of the pieces to be joined, secondly, form overhanging ledges on the raised portions and then joint the pieces into a single unit;

FIGURE 6 is a fragmentary side elevation showing a pair of pieces having formed matching surfaces, with a strip of material positioned therebetween to be joined therebetween by the application of pressure; and FIGURE 7 is a side elevation of the joined pieces shown in FIGURE 6;

FIGURE 8 is a view of a pair of rolls, one of them fragmentary, for use in forming raised portions and depressions on the materials to be joined at certain areas only;

FIGURE 9 is a fragmentary view of two pieces of material showing matching raised portions and depressions on the surfaces formed by rolls of the type shown in FIGURE 8, but on a smaller scale; an arrow is shown which indicates how the two pieces of material are to be assembled at their formed faces.

Like characters of reference designate like parts in the several views.

The joining of materials according to this invention requires that the surfaces of the materials to be joined are provided with matching formations. These matching formations may be formed by any one of well known methods such as casting, molding, extrusion or rolling.

In FIGURE 1 a piece of material 9 is being passed between a pair of rolls 10 and 11 whereby raised portions 12 and depressions 13 are formed on one face, thereby providing a formed surface.

This formed surface of the piece of material 9 comprising raised portions 12 and depressions 13, alternately spaced, is then passed between a pair of smooth rolls 14 and 15 as shown in FIGURE 2, thereby mashing the tops of the raised portions 12 which forms heads 16 having overhang ledges 17 and 18, and thereby provides a piece of material 9a having interlocking means. It is understanding however, that other means of forming may be used.

In FIGURE 3 two pieces of material 9a are shown in meshing engagement. As can be seen from the drawing the spacing between the heads 16 is such that they are free to move into their respective opposing depressions 13 when the two pieces 9a are assembled in meshing engagement. When the two pieces of material 9a have been assembled as shown in FIGURE 3, pressure is applied by a suitable means such as passing the assembled pieces 9a through a pair of rolls 19 and 20 as shown in FIGURE 4 to thereby unite them.

After suitable pressure has thus been applied an interference locking occurs by virtue of the flow of material with complete filling of the voids as can be seen by viewing FIGURE 4.

FIGURE 5 shows a production plan for joining two pieces of material which comprises passing the two pieces of material through a series of rolls. The pieces are passed separately through pairs of rolls 10 and 11, and 10a and 11a respectively which forms pieces of material with formed surfaces as in pieces of material 9, which face each other inwardly. They then pass through another set of rolls 14 and 15 and 14a and 15a respectively whereby the raised portions are mashed and take on the characteristics of the piece of material 9a. The pieces of material thus treated now pass between two rolls whereby the mashed raised portions and the depressed portions of the respective pieces of material are placed in meshing engagement, after which they pass through the last pair of rolls 19 and 20 which provides pressure to thereby join them.

For certain purposes it may be desirable to provide a sheet of material between the pieces to be joined. In FIGURE 6 such a piece of material 21, is shown assembled between the formed surfaces of the two pieces of material 9a before they were joined. The joining of the parts thus assembled, is accomplished by the application of pressure resulting in interlocking of all pieces as shown in FIGURE 7.

In the event it is desirable to join pieces of material at certain areas only, formed surfaces may be provided in those areas at which the surfaces are to be joined. For this purpose a pair of rolls may be provided, one being smooth and the other having formed surfaces at various areas which provide spot formations in the work piece. In FIGURE 8 such a pair of rolls is shown. One of these rolls 22 is smooth and the other roll 23 is provided with three sets of formations 24, 25 and 26 which produce formed spot surfaces 27, 28 and 29, in a piece of material 30, as shown in FIGURE 9, a reverse pair of rolls produces a mirror image set of formations in a piece of material 30a when passed therethrough which produce spot formations 27a, 28a and 29a which match the spot formations 27, 28 and 29 respectively, whereby, the pieces of material 30 and 30a may be processed as heretofore shown and joined at their respective spot formations.

It is apparent that pieces of material which are to be joined may be provided with formations on both sides and that when the techniques heretofore shown are applied more than two pieces may be joined.

In general, the methods according to this invention, comprise the formation of raised portions alternating with depressed portions on the surface of a piece of material to be joined to another piece of material, and the forming of raised portions alternating with depressed portions on the surface of the other piece of material matching those of the first piece of material, mashing the raised portions on the pieces of material thus formed, whereby overhanging ledges are formed on the raised portions, and assembling the pieces at their formed areas and applying pressure which thereby interlocks the pieces of material at formed area.

I wish it to be understood that my invention is not to be limited to the specific instructions and methods shown and described, except, only, insofar as the claims may be so limited, as it will be understood to those skilled in the art, that changes may be made without departing from the principles of the invention.

I claim:

1. In a method of joining pieces of malleable material comprising the steps of, providing the pieces of malleable material to be joined, forming raised portions and depressed portions on at least one face of each of said pieces of material, the said raised portions and depressed portions of said pieces of material being such that the said raised portions and depressed portions of the respective pieces of material are of matching configuration, mashing the raised portions of each of said pieces of material to a degree such that overhanging ledges are formed on said raised portions of each of said pieces of material said overhanging ledges being of a magnitude such as to interlock when said pieces of material are joined in accordance with succeeding steps, assembling said pieces of material with said overhanging ledges and said depressed portions engaging said depressed portions of one of said pieces of material engaging said depressed portions and overhanging ledges, respectively, of another of said pieces of material and providing pressure against said assembled pieces of material to a degree such that the raised portions with overhanging ledges thereon flow and fill the said depressed portions and thus join the assembled pieces of material in interlocking interference between the said overhanging ledges of the respective pieces of material substantially intermediate between the pieces of material thus joined.

2. In a method according to claim 1 including the step of inserting a sheet of material between the said pieces of material before joining.

3. In a method according to claim 1 wherein the said pieces of material are provided with mashed raised portions and depressed portions at certain areas only whereby said pieces of material are joined only at those areas.

4. In a method of joining pieces of malleable material comprising the steps of, providing the pieces of malleable material to be joined, passing the said pieces of material through a pair of rolls to thereby provide raised portions and depressed portions on at least one face of each of said pieces of material, the said raised portions and depressed portions of said pieces of material being such that the said raised portions and depressed portions of the respective pieces of material are of matching configuration, mashing the raised portions of each piece of material to a degree such that overhanging ledges are formed on said raised portions of each of said pieces of material said overhanging ledges being of a magnitude such as to interlock when said pieces of material are joined in accordance with succeeding steps, assembling said pieces of material with said overhanging ledges and said depressed portions of one of said pieces of material engaging said depressed portions and overhanging ledges, respectively, of another of said pieces of material, and providing pressure against said assembled pieces of material to a degree such that the raised portions with overhanging ledges thereon flow and fill the said depressed portions and thus join the assembled pieces of material in interlocking interference between the said overhanging ledges of the respective pieces of material substantially intermediate between the pieces of material thus joined.

References Cited in the file of this patent

UNITED STATES PATENTS

| | | |
|---|---|---|
| 1,163,784 | Skinner | Dec. 14, 1915 |
| 1,205,174 | Dodds | Nov. 21, 1916 |
| 1,729,747 | Palm | Oct. 1, 1929 |
| 3,000,093 | Wredenfors | Sept. 19, 1961 |